United States Patent [19]

Paulsen

[11] Patent Number: 5,097,356
[45] Date of Patent: Mar. 17, 1992

[54] OPTICAL SCANNER WITH DAMPED COUPLING

[75] Inventor: Dean Paulsen, Watertown, Mass.

[73] Assignee: General Scanning, Inc., Watertown, Mass.

[21] Appl. No.: 531,928

[22] Filed: Jun. 1, 1990

[51] Int. Cl.⁵ .................................. G02B 26/10
[52] U.S. Cl. .......................... 359/214; 359/196; 359/221; 359/224; 310/326
[58] Field of Search ............. 350/6.1, 6.6, 6.9, 6.91, 350/486, 487; 310/326

[56] References Cited

U.S. PATENT DOCUMENTS

| | | | |
|---|---|---|---|
| 1,636,692 | 7/1927 | Hill . | |
| 1,832,285 | 11/1931 | Elmer . | |
| 3,799,644 | 3/1974 | Street | 359/223 |
| 3,998,530 | 12/1976 | Kaschak | 359/225 |
| 4,632,501 | 12/1986 | Glynn | 359/214 |
| 4,655,543 | 4/1987 | Montagu | 359/214 |
| 4,778,233 | 10/1988 | Christensen et al. | 359/214 |
| 4,802,720 | 2/1989 | Paulsen | 359/214 |
| 4,919,500 | 4/1990 | Paulsen | 359/214 |

Primary Examiner—Loha Ben
Attorney, Agent, or Firm—Cesari and McKenna

[57] ABSTRACT

An optical scanner has a visco-elastic material within a flexible coupling in its shaft assembly. The flexible coupling serves to permit bending of the assembly in response to lateral vibration. However, in response to the bending, the visco-elastic material disposed therein undergoes viscous deformation, thereby acting upon the shaft to rapidly damp the vibration.

22 Claims, 4 Drawing Sheets

OPTICAL SCANNER WITH DAMPED COUPLING

FIELD OF THE INVENTION

This invention relates generally to optical systems, and more specifically to optical scanners.

BACKGROUND OF THE INVENTION

Optical scanners direct a light beam to scan the surface of a remote object. This is typically accomplished by using a mirror which reflects the beam toward a desired location on the object surface. Usually, the mirror is mounted onto a rotatable shaft assembly which is driven by a motor. Thus, as the motor drives the shaft to rotate the mirror, the beam is swept across the surface of the remote object.

The precision of an optical scanner depends largely on its ability to steer the beam without being disturbed by various stimuli which divert the beam from its intended path. One type of such stimulus is nontorsional vibration of the shaft that rotates the mirror.

Such vibration may be externally induced by disturbances that jar the base of the scanner, causing the shaft to vibrate in the nontorsional direction. Similarly, imbalances within the rotational system of the scanner may cause nontorsional vibration of the shaft. These imbalances manifest themselves, in particular, when a saw-tooth signal drives the scanner. Such waveform causes the scanner to sweep the beam across the object surface and abruptly snap back at the end of each sweep. This torsionally shocks the shaft assembly and causes it to vibrate in the lateral or off-axis direction.

It is desirable, therefore, to reduce nontorsional vibration of the shaft during scanner operation.

SUMMARY OF THE INVENTION

The invention resides in disposing lossy material in the shaft assembly of an optical scanner. The lossy material is disposed, in particular, within a flexible coupling in the shaft assembly. The flexible coupling serves to permit bending of the assembly in response to lateral vibration. However, in response to the bending, the lossy material disposed therein undergoes viscous deformation, thereby acting upon the shaft to rapidly damp the vibration.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
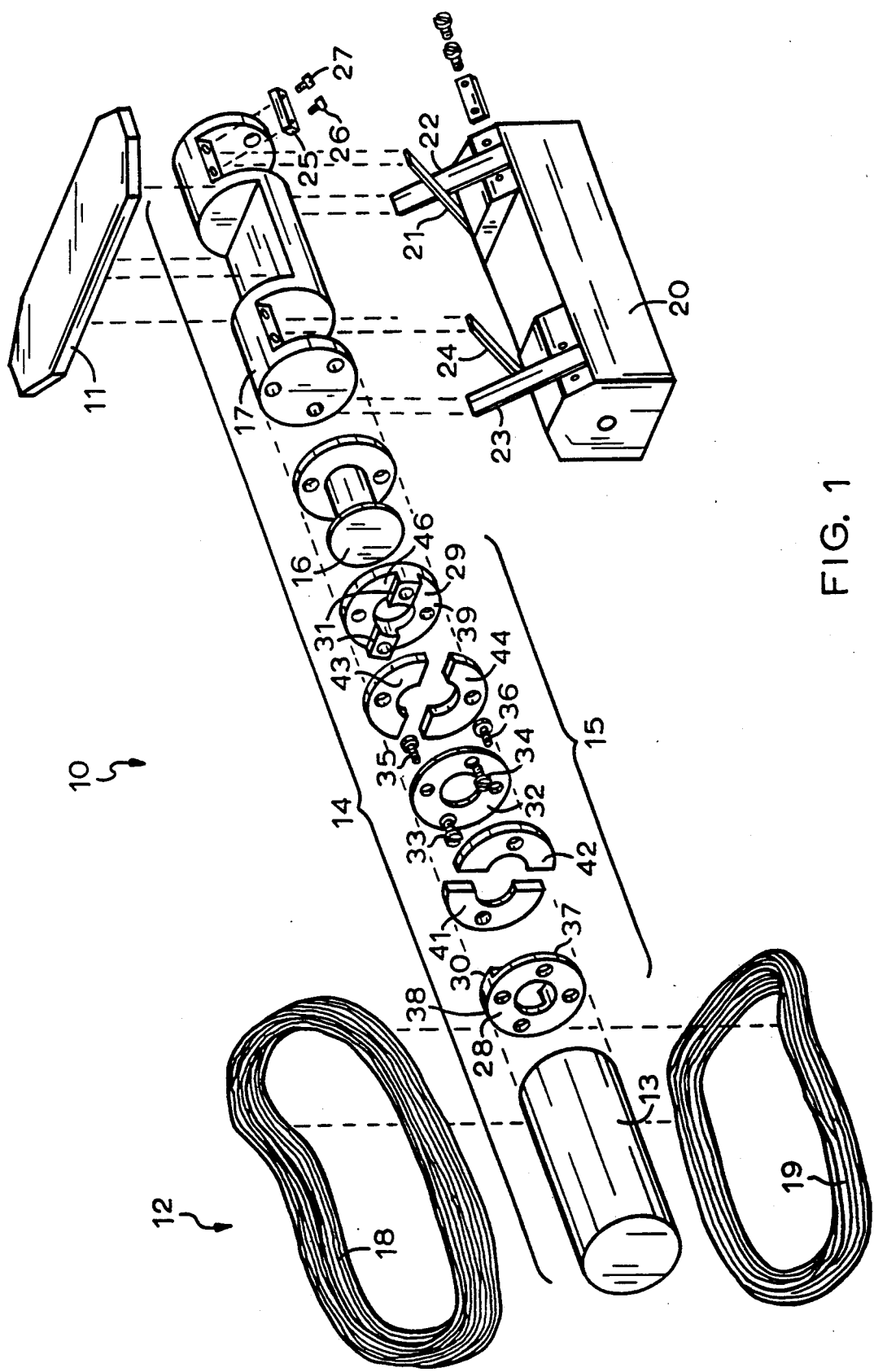
FIG. 1 is an exploded view of an optical scanner that employs the teachings of the present invention.

FIG. 1 shows an optical scanner 10 for directing a light beam onto a remote surface (not shown). The scanner uses a mirror 11 to steer the beam so as to reflect it toward desired locations on the surface. This is accomplished by means of a limited-rotation motor 12 containing a rotor 13 which rotates a shaft assembly 14 onto which the mirror 11 is mounted.

The shaft assembly 14 comprises four components which rotate about their respective longitudinal axes. These components include, in order, the rotor 13, a flexible coupling 15, a spacer 16, and a shaft 17 to which the mirror 11 is attached. The motor 12 is comprised of drive coils 18 and 19, along with the rotor 13, which is a magnet juxtaposed to the coils. Essentially, the motor 12 is a galvanometer for angularly displacing the rotor 13 as a function of current flow through the coils 18 and 19. Typically, a saw-tooth signal is applied to the motor 12 to cause the shaft assembly 13 to move the beam back and forth.

The entire rotatable shaft assembly 14, including the rotor 13, is supported by a base 20 and flexure elements 21, 22, 23 and 24 forming a flexural pivot for the shaft assembly 14. These flexure elements serve also as springs that apply a restoring torque in response to rotation by the shaft assembly 14. One end of each flexure element is fastened to the shaft 17, while the other end is fastened to the base 20. Attachments are provided by clamps 25 secured by screws 26 and 27, as illustrated for one end of the flexure element 21.

The flexible coupling 15 functions effectively as a universal joint between the rotor 13 and the shaft 17 components of the shaft assembly 14. It permits the shaft assembly 14 to bend between the rotor 13 and shaft 17 components in a direction transverse to the rotational axis of the shaft assembly 14, but prevents relative rotation between those two components.

At one end of the flexible coupling 15, an end piece 28 is attached with an adhesive to the rotor 13; while at the other end, an end piece 29 is attached with an adhesive to one end of the spacer 16, which is similarly secured at its opposite end to the shaft 17. These end pieces 28 and 29 have respectively bosses 30 and 31 to which an intervening flexible, resilient disk 32 is attached with screws 33, 34, 35 and 36.

The bosses 30 and 31, along with the disk 32, define voids 37, 38, 39, and 40 within the coupling 15 where the disk 32 can freely flex. Specifically, the axis defined by the bosses associated with one end piece is substantially orthogonal to the axis defined by the bosses associated with the other end piece. Moreover, the flexible disk 32 is made of a material, such as tempered steel, which provides a restoring force during off-axis bending of the rotating system and thus tends to restore coaxial alignment of the components.

Additionally, the flexible coupling 15 includes lossy material in the form of visco-elastic segments 41, 42, 43, and 44. These segments, which are preferably of rubber-like material, fill the voids 37, 38, 39, and 40. Thus, when the flexible coupling 15 bends in an off-axis direction, some of these segments become compressed and undergo viscous deformation. This serves to damp vibration in the bending mode of the shaft assembly 14. The damping is enhanced by cementing the segments to the disk 32 and the end pieces 28 and 29, in which case some of the segments will stretch during bending of the rotating system.

The degree of damping provided by the lossy segments can be controlled by selection of such parameters as the material of the segments, their dimensions, and the spring constant of the disk 32. For instance, by employing a flexible coupling of the illustrated type, the duration of nontorsional vibration was reduced from hundreds of cycles at 240 Hz to a slightly underdamped 2 or 3 cycles.

When the shaft assembly 14 is operated in a horizontal position, it is desirable to prevent the rotor 13 from drooping excessively. The forces necessary to minimize droop are exerted largely by the flexible disk 32 and the lossy segments 17, 18, 19, and 20. For example, a flexible coupling 15 having a spring constant of about 0.56 in-lb/degree ($6.33 \times 10^5$ cm-dyne/degree) coupled to a rotor 13 weighing 0.177 lbs (0.0804 kg.) provides an acceptable deflection of 0.27 degrees or about 0.008″ (0.0203 cm.) at the end of the rotor 13.

In addition, a suitable feedback system may be employed using the sensor disclosed in Paulsen U.S. Pat. No. 4,673,876 for a "Two-Element Angular Positive Sensor for Rotatable Shaft" to ensure that the position of the mirror 11 tracks an input control signal within the response capability of the overall system.

Figure 2:
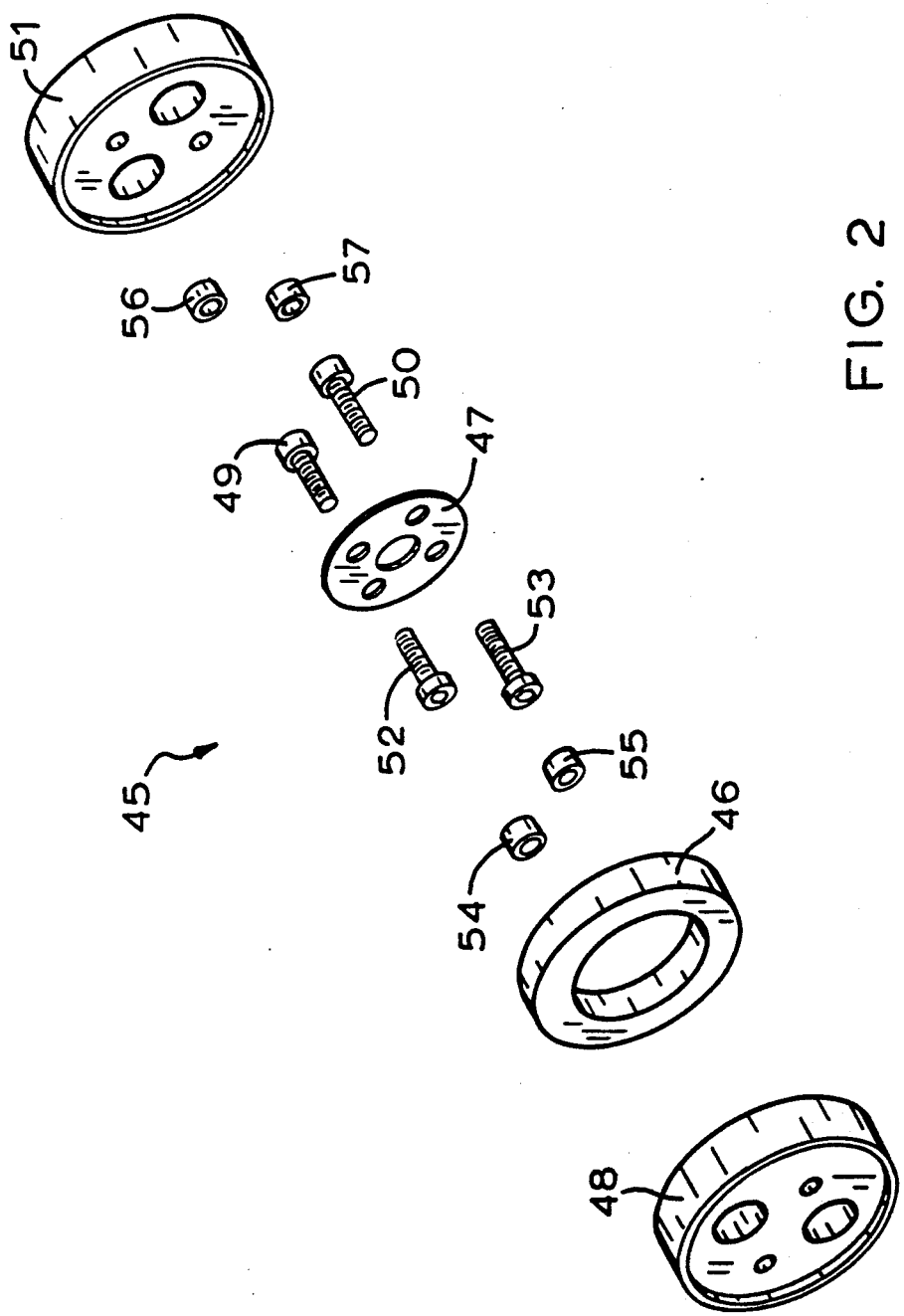
FIG. 2 is an exploded view of an alternative embodiment of the flexible coupling depicted in FIG. 1.

FIG. 2 illustrates another embodiment of the invention. A flexible coupling 45 employs a single ring 46 of lossy material instead of the multiple segments 41-44 of FIG. 1. A flexible disk 47 is connected to an end piece 48 by means of screws 49 and 50 and to an end piece 51 by means of screws 52 and 53. Spacers 54, 55, 56, and 57 space the disk 47 from the end pieces 48 and 51 and thus provide the same function as the bosses 30 and 31 of FIG. 1. The screws 49, 50, 52, and 53 are spaced inwardly from the peripheries of the disk 47 and end pieces 48 and 51 to accommodate the lossy ring 46 as shown. If desired, a second lossy ring (not shown) can be disposed at the opposite side of the disk 47.

Figure 3:
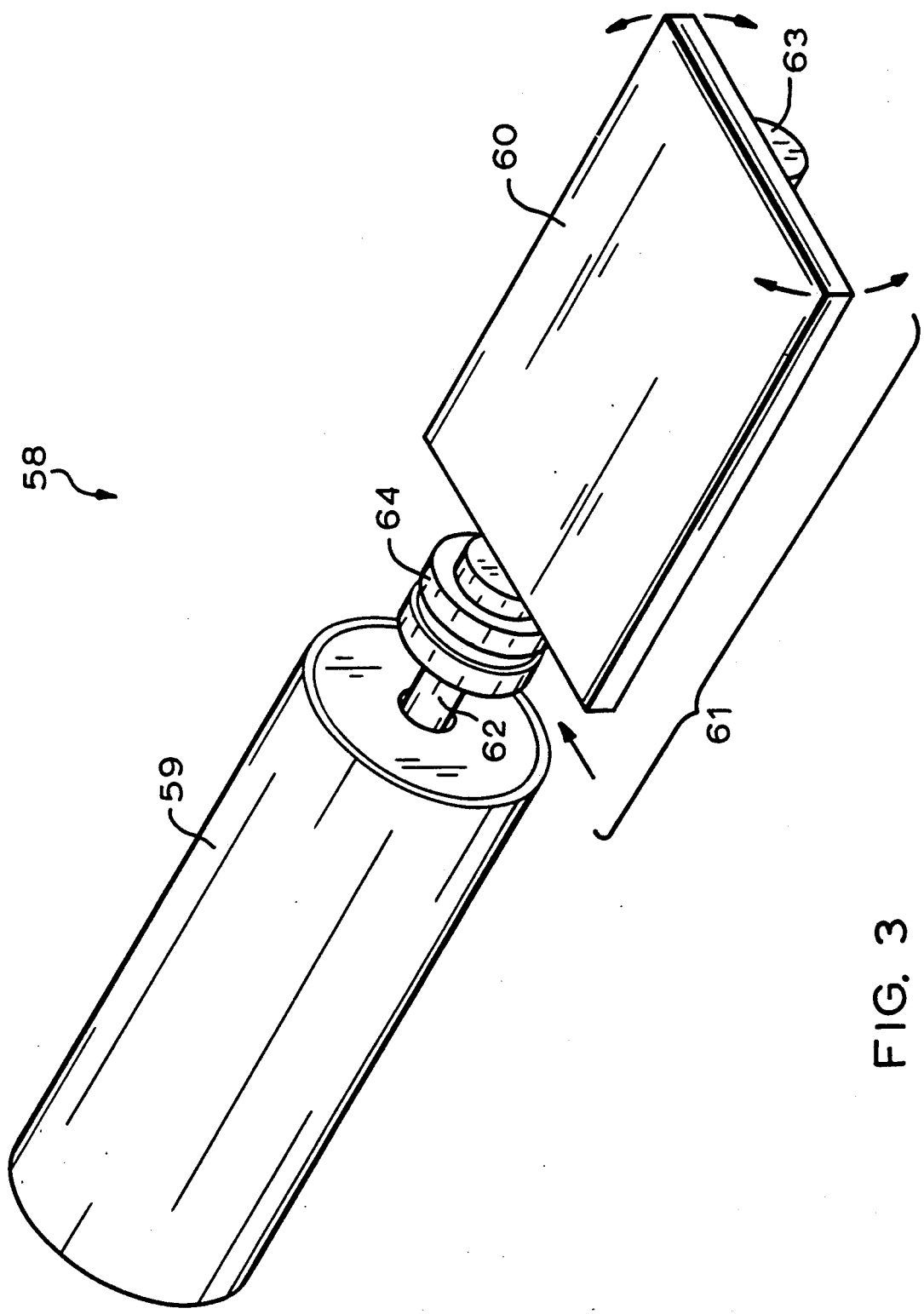
FIG. 3 is an axonometric view of another embodiment of the optical scanner of the present invention.

FIG. 3 illustrates another embodiment of the present invention. Like the scanner 10 of FIG. 1, a variant scanner 58 as shown in FIG. 3 uses a torque motor 59 to rotate a mirror 60 attached to shaft assembly 61. The shaft assembly 61 also includes a rotor 62 of the motor 59, a shaft 63 onto which the mirror 60 is mounted, and a flexible coupling 64 which couples the rotor 62 to the shaft 63. The flexible coupling 64 may be configured as either the flexible coupling 15 or 45.

Unlike the shaft assembly 14 of the scanner 10, which is supported at its shaft 17, however, the shaft assembly 61 is supported at its rotor 62 component by a suitable support structure (not shown). Since the shaft component 63 of the shaft assembly 61 may droop when horizontally installed, this scanner is preferably used in vertical shaft applications.

Figure 4:
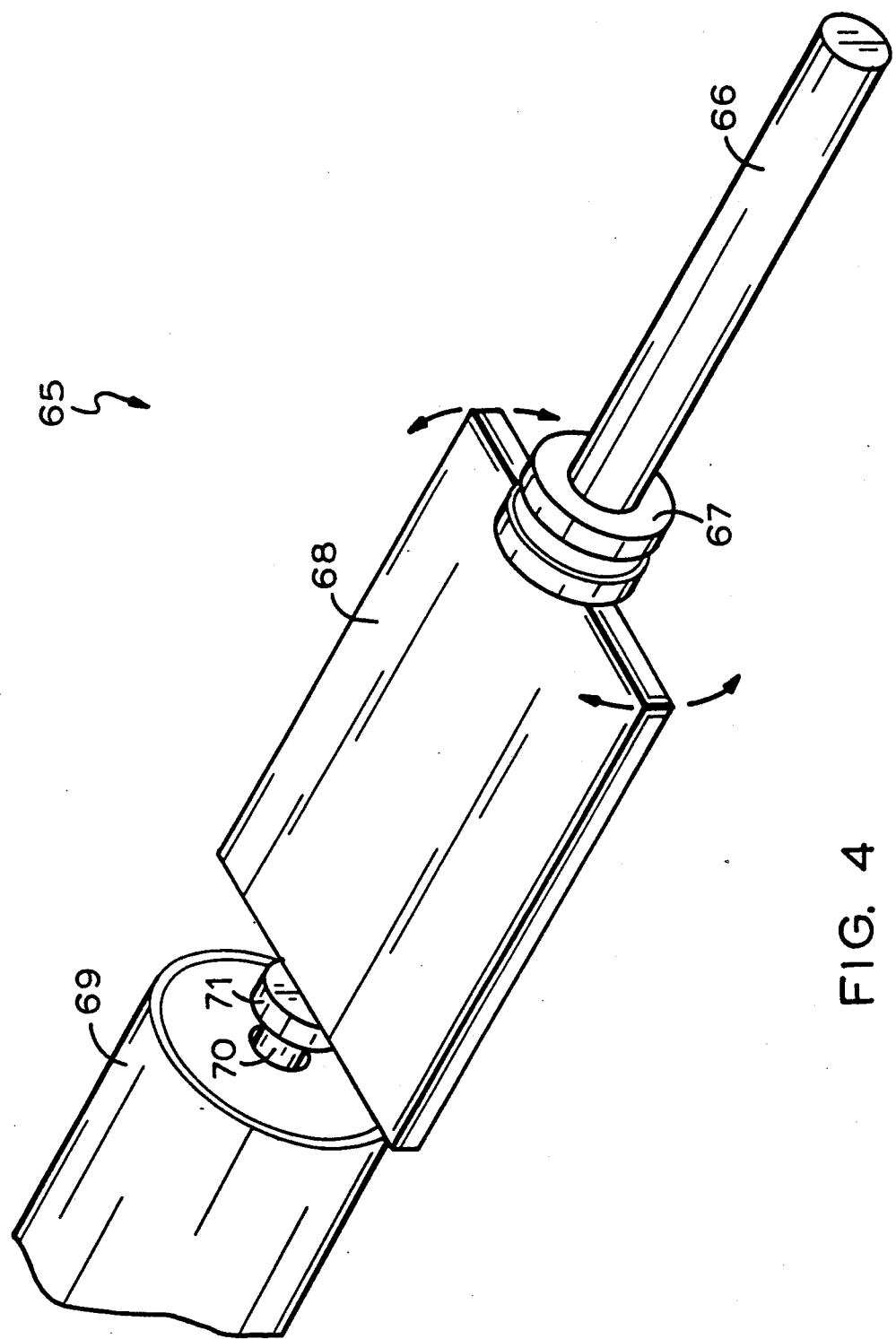
FIG. 4 is an axonometric view of yet another embodiment of the present invention.

In FIG. 4, the shaft of a scanner 65 is extended to include a rod component 66. The rod 66 is made of a dense material such as lead or tungsten. It serves as a reaction mass for a dynamic vibration absorber to damp the nontorsional vibration of the shaft assembly. The rod 66 has a large length-to-diameter ratio so that its rotational inertia about its longitudinal axis is low.

A damped flexible coupling 67 couples the rod 66 to a shaft (not shown) on which a mirror 68 is mounted. Either the flexible coupling 15 of FIG. 1 or the flexible coupling 45 of FIG. 2 may be the flexible coupling 67. A motor 69, similar to the torque motor 59, has a rotor 70 which is coupled by another coupling 71 to the shaft component.

The foregoing description has been limited to specific embodiments of this invention. It will be apparent, however, that variations and modifications may be made to the invention, with the attainment of some or al of its advantages. Therefore, it is the object of the appended claims to cover all such variations and modifications as come within the true spirit and scope of the invention.

What is claimed is:

1. A scanner comprising:
   (a) a mirror assembly for reflecting light and mounted for pivoting about a mirror axis,
   (b) a motor for pivoting the mirror assembly about the mirror axis, and
   (c) a flexible coupling having a first end piece connected to the motor and a second end piece connected to the mirror assembly and permitting relative cross-axis displacement therebetween, the flexible coupling including damping material disposed between the first and second end pieces for viscous deformation in response to relative off-axis motion between the first and second end pieces so as to damp such motion.

2. The scanner of claim 1, wherein the damping material includes a visco-elastic member that is compressed by bending of the coupling.

3. The scanner of claim 1, wherein the flexible coupling further includes:
   (a) a resilient disk and
   (b) a plurality of bosses, at least one side of the disk being secured to the bosses, the bosses forming voids where the disk may freely flex and the damping material is disposed.

4. The scanner of claim 1, wherein the mirror assembly is supported by a flexural pivot.

5. The scanner of claim 1, wherein the motor is a galvanometer.

6. The scanner in accordance with claim 1, wherein the motor comprises a limited-rotation motor for angularly displacing the mirror assembly about the mirror axis, said motor has a rotor to which the first end piece is connected, and said scanner further includes a shaft for connecting the mirror assembly to the second end piece.

7. The scanner in accordance with claim 6, wherein the flexible coupling prevents relative rotation between the rotor and the mirror assembly.

8. The scanner in accordance with claim 1, wherein the cross-axis displacement comprises displacement in a direction transverse to the mirror axis.

9. The scanner in accordance with claim 1, further comprising a spacer for connecting the second end piece and the mirror assembly.

10. A scanner comprising:
    (a) a mirror assembly for reflecting light and for pivoting about a mirror axis,
    (b) a motor coupled with said mirror assembly for pivoting the mirror assembly about the mirror axis,
    (c) a reaction mass for resisting non-torsional vibration, and
    (d) a flexible coupling having a first end piece connected to the reaction mass and a second end piece connected to the mirror assembly so as to permit relative cross-axis displacement therebetween, the flexible coupling including damping material disposed between the first and second end pieces for viscous deformation in response to relative off-axis angular motion between the first and second end pieces so as to damp such motion.

11. The scanner of claim 10, wherein the reaction mass is a rod made of dense material.

12. A scanner comprising:
    a) a mirror assembly for reflecting light, said mirror assembly being mounted for pivoting about a mirror axis,
    b) a motor, and c) a shaft assembly rotatable by said motor about a rotation axis for pivoting the mirror assembly about the mirror axis, said shaft assembly including
  (i) a flexible coupling,
  (ii) means for connecting said motor to the flexible coupling, and
  (iii) means for connecting said mirror assembly to the flexible coupling,
said flexible coupling drivingly interconnecting the motor-connecting means and said mirror-assembly-connecting means, having a first end piece connected to said motor-connecting means and a second end piece connected to the mirror-assembly-connecting means and permitting relative cross-axis displacement therebetween, said flexible coupling including visco-elastic material disposed between said first and second end pieces for damping relative cross-axis motion between said first and second end pieces.

13. The scanner in accordance with claim 12, wherein said cross-axis motion comprises vibration and said visco-elastic material is disposed so as to compress and undergo viscous deformation in response to said vibration and thereby to damp said vibration.

14. The scanner in accordance with claim 12, wherein said flexible coupling further comprises:
  a) a first attachment element attached to said motor-connecting means, and having a first boss;
  b) a second attachment element attached to said mirror-assembly-connecting means, and having a second boss; and
  c) a flexible, resilient disk disposed between and attached to said first and second attachment elements; said first and second bosses and said disk defining a plurality of spaces wherein said disk can flex; and
  d) wherein said visco-elastic material comprises a plurality of visco-elastic elements disposed within said spaces.

15. The scanner in accordance with claim 14, wherein said disk provides restoring forces in response to said cross-axis displacement.

16. The scanner in accordance with claim 14, wherein each of said visco-elastic elements is secured to said disk and one of said attachment elements so as to stretch and compress in response to said cross-axis displacement.

17. The scanner in accordance with claim 12, wherein said flexible coupling comprises:
  a) a first attachment element attached to said motor-connecting means,
  b) a second attachment element attached to said mirror-assembly-connecting means,
  c) a flexible disk disposed between and attached to said first and second attachment elements, and
  d) spacer means coupled to said first and second attachments elements and said disk for maintaining said disk at a selected position spaced form said first and second attachment elements, and
  e) wherein said visco-elastic material comprises a first visco-elastic element disposed between said first attachment element and said disk, and a second visco-elastic element disposed between said second attachment element and said disk.

18. The scanner in accordance with claim 17, wherein each of said first and second visco-elastic elements comprises a ring disposed generally coaxially about said rotation axis.

19. The scanner in accordance with claim 12, wherein said motor comprises a limited-rotation motor for angularly displacing said mirror assembly about the mirror axis, said motor-connecting means comprises a rotor to which said first end piece is connected, and said mirror-assembly-connecting means comprises a shaft to which said second end piece is connected.

20. The scanner in accordance with claim 19, wherein said flexible coupling prevents relative rotation between said rotor and said mirror assembly.

21. The scanner in accordance with claim 19, further including a base for supporting said shaft assembly, and at least one flexure element having a first end connected to said base and a second end connected said shaft assembly for applying a restoring torque to the shaft assembly in response to rotation by the shaft assembly.

22. The scanner in accordance with claim 19, wherein said mirror-assembly-connecting means further comprises a spacer for connecting said second end piece and said shaft.

* * * * *